United States Patent
Kim

(10) Patent No.: US 8,428,666 B2
(45) Date of Patent: Apr. 23, 2013

(54) WIRELESS HEADSET AND MULTIPOINT PAIRING METHOD FOR THE SAME

(75) Inventor: Deok-Seong Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 473 days.

(21) Appl. No.: 12/351,270

(22) Filed: Jan. 9, 2009

(65) Prior Publication Data

US 2009/0186580 A1    Jul. 23, 2009

(30) Foreign Application Priority Data

Jan. 23, 2008    (KR) ........................ 10-2008-0007059

(51) Int. Cl.
*H04M 1/00*    (2006.01)
(52) U.S. Cl.
USPC ................................... 455/575.2; 379/428.02
(58) Field of Classification Search .................. 455/3.06, 455/569.1, 556.1
See application file for complete search history.

(56) References Cited

U.S. PATENT DOCUMENTS

| 2005/0107120 A1 | 5/2005 | Yueh |
| 2007/0004472 A1 | 1/2007 | Gitzinger |
| 2008/0242365 A1* | 10/2008 | Rokusek et al. ........... 455/569.1 |

FOREIGN PATENT DOCUMENTS

| JP | 2003125478 | 4/2003 |
| JP | 2007259276 | 10/2007 |
| KR | 200274628 | 4/2002 |
| KR | 0405135 | 10/2003 |
| KR | 1020040006850 | 1/2004 |

* cited by examiner

*Primary Examiner* — Tu X Nguyen
(74) *Attorney, Agent, or Firm* — H.C. Park & Associates, PLC

(57) ABSTRACT

A wireless headset and multi-point pairing method for the same are disclosed. The wireless headset can be easily paired with multiple wireless-enabled devices. The method includes establishing a wireless connection to a first wireless device during a wireless connection mode, requesting a mode transition to a pairing mode during the wireless connection mode, making a mode transition from the wireless connection mode to the pairing mode without turning off the headset, performing a pairing procedure with a second wireless device during the pairing mode, and establishing a wireless connection to the second wireless device in addition to the first wireless device after the pairing procedure is completed.

12 Claims, 2 Drawing Sheets

WIRELESS HEADSET AND MULTIPOINT PAIRING METHOD FOR THE SAME

CROSS REFERENCE TO RELATED APPLICATION

This application claims priority from and the benefit of Korean Patent Application No. 10-2008-0007059, filed on Jan. 23, 2008, which is hereby incorporated by reference for all purposes as if fully set forth herein.

BACKGROUND OF THE INVENTION

1. Field of the Invention

The present invention relates generally to Bluetooth® communication and, more particularly, to a Bluetooth® headset that may be readily capable of pairing with multiple Bluetooth®-enabled devices, and to a multipoint pairing method for the same.

2. Discussion of the Background

With popularization of mobile terminals, technologies enabling data exchange between nearby mobile terminals have been developed. Among short-range data communication technologies, Bluetooth®-based wireless data transmission has attracted much attention.

A recently developed Bluetooth® headset supporting Bluetooth® Specification 2.0 provides a multipoint connection feature. The multipoint technology enables a Bluetooth® headset to connect to two or more Bluetooth®-enabled devices (such as a mobile terminal and MP3 player) at the same time. Thanks to the multipoint technology, the user of a Bluetooth® headset may handle multiple devices. For example, when a Bluetooth® headset is in communication with a mobile terminal and MP3 player through a multipoint connection, the user of the Bluetooth® headset may both enjoy music using the MP3 player and answer a call using the mobile terminal. That is, when the mobile terminal receives a call while the MP3 player is playing music to the Bluetooth® headset, the user can answer the call through the same Bluetooth® headset.

Before establishing a connection between two Bluetooth®-enabled devices, the devices may have to perform a pairing procedure to register each other. For example, in the case of a Bluetooth® headset and a mobile terminal, the user may direct the Bluetooth® headset to enter the pairing mode, and may direct the mobile terminal to enter the device inquiry mode so that the mobile terminal can search for the Bluetooth® headset. When the mobile terminal finds the Bluetooth® headset, the user directs the mobile terminal to register the Bluetooth® headset.

In general, to enter the pairing mode, a Bluetooth® headset may require its user to perform an operation (for example, pressing the 'power' button for an extended duration) when the headset is turned on.

In order for a Bluetooth® headset to establish a multipoint connection with two Bluetooth®-enabled devices, the Bluetooth® headset may have to perform a pairing procedure for each Bluetooth®-enabled device (two pairings). In this process, the Bluetooth® headset may have to be turned off and then back on.

SUMMARY OF THE INVENTION

The present provides a Bluetooth® headset that can perform a pairing procedure with distinct Bluetooth®-enabled devices without turning-off and tuning-on, and a multi-point pairing method for the same.

Additional features of the invention will be set forth in the description which follows, and in part will be apparent from the description, or may be learned by practice of the invention.

The present invention discloses a wireless headset including a key input unit to request a mode transition from a wireless connection mode to a pairing mode while maintaining a wireless connection to a first wireless device, a mode switcher to make a mode transition from the wireless connection mode to the pairing mode in response to a mode change request, and a pairing performer to perform a pairing procedure with a second wireless device during the pairing mode.

The present invention also discloses a multi-point pairing method for a wireless headset including establishing a wireless connection to a first wireless device during a wireless connection mode, requesting a mode transition to a pairing mode during the wireless connection mode, making a mode transition from the wireless connection mode to the pairing mode in response to the mode change request, performing a pairing procedure with a second wireless device during the pairing mode, and establishing a wireless connection to the second wireless device while maintaining the wireless connection to the first wireless device after the pairing procedure is completed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
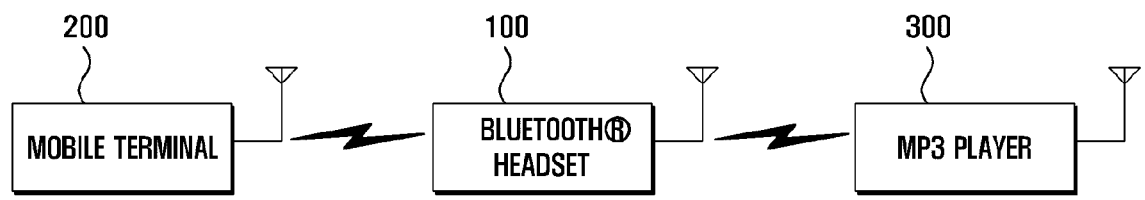
FIG. 1 shows a configuration of a connection between a Bluetooth® headset and Bluetooth®-enabled devices.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

In the accompanying drawings, some elements are exaggerated, omitted, or only outlined in brief, and thus may not be drawn to scale.

A Bluetooth® headset according to an exemplary embodiment of the present invention may use a wireless connection to communicate with other Bluetooth®-enabled devices. In the description, a Bluetooth® headset is depicted as a representative headset and communicates with other Bluetooth®-enabled devices through wireless Bluetooth® communication. Other short-range wireless communication technologies, enabling signal transmission and reception though a wireless communication channel, such as infrared and ZigBee® technology, may also be used for the headset of the present invention.

A Bluetooth® headset may operate in a pairing mode and a Bluetooth® connection mode. In the pairing mode, the Bluetooth® headset performs a pairing procedure to register other Bluetooth®-enabled devices. In the Bluetooth® connection mode, the Bluetooth® headset establishes a Bluetooth® connection to a Bluetooth®-enabled device registered through a pairing procedure and then performs Bluetooth® communication.

FIG. 1 shows a configuration of a connection between a Bluetooth® headset 100 and two Bluetooth®-enabled devices 200 and 300.

Referring to FIG. 1, the Bluetooth® headset 100 is connected to two Bluetooth®-enabled devices 200 and 300 (mobile terminal and MP3 player). The Bluetooth®-enabled devices 200 and 300 are connected through Bluetooth® communication to the Bluetooth® headset 100, and send and receive various data including control signals and voice signals to and from the Bluetooth® headset 100 according to the Bluetooth® protocol.

The Bluetooth® headset 100 converts data coming from the Bluetooth®-enabled devices 200 and 300 into audible sounds and outputs the audible sounds. As such, the Bluetooth® headset 100 may include various elements.

Figure 2:
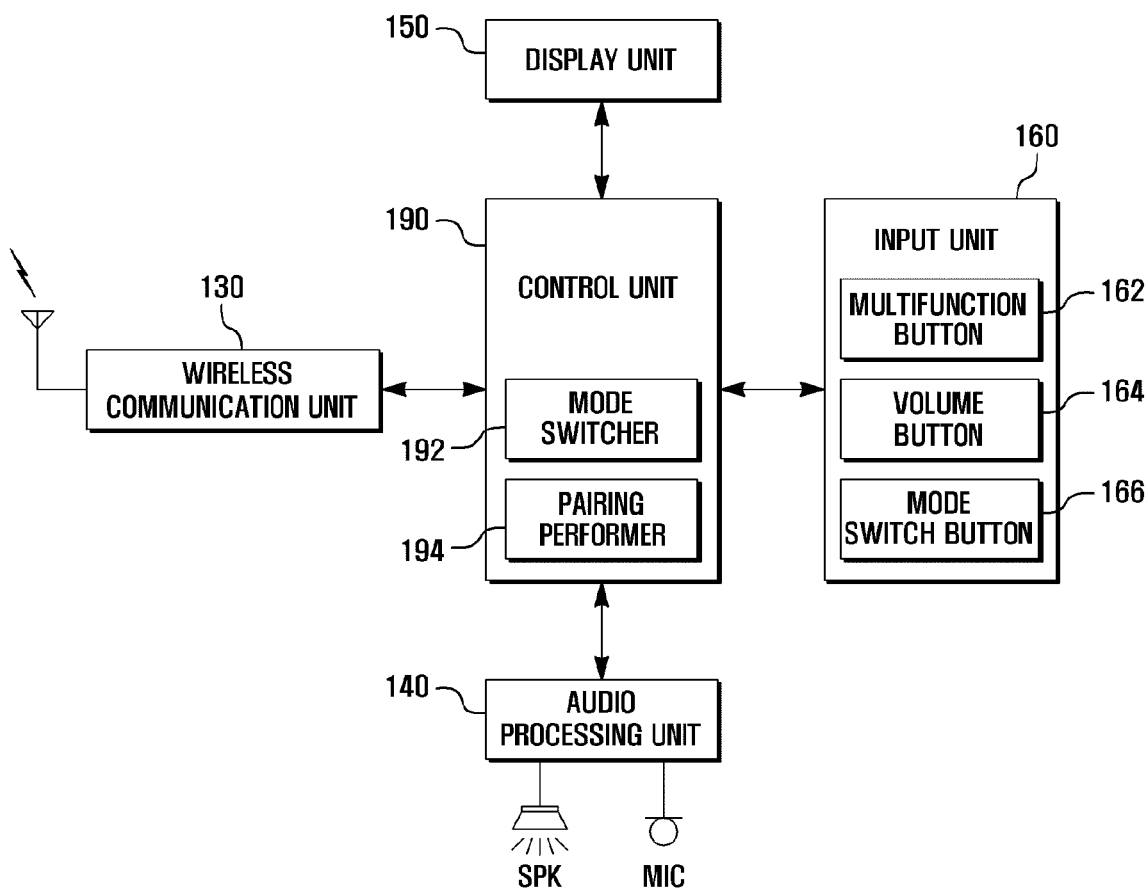
FIG. 2 is a block diagram showing a Bluetooth® headset according to an exemplary embodiment of the present invention.

FIG. 2 is a block diagram showing a Bluetooth® headset 100 according to an exemplary embodiment of the present invention.

Referring to FIG. 2, the Bluetooth® headset 100 includes a wireless communication unit 130, an audio processing unit 140, a display unit 150, an input unit 160, and a control unit 190.

The wireless communication unit 130 includes a communication module for short-range communication. In particular, the wireless communication unit 130 includes a Bluetooth® module (not shown) for short-range Bluetooth® communication. The Bluetooth® module communicates with another Bluetooth®-enabled device, such as a mobile terminal, an MP3 player, a personal computer, or a personal digital assistant, through a Bluetooth® antenna according to the Bluetooth® protocol. The Bluetooth® module stores a Bluetooth® host stack for Bluetooth® communication, as well as Bluetooth® profiles and application programs selectable according to functions and conditions of external Bluetooth®-enabled devices. As such, the wireless communication unit 130 may include a storage section. The Bluetooth® profiles may be diverse and may include a Hands-Free profile (HFP) for a hands-free device, a Headset profile (HSP) for a headset, an Advanced Audio Distribution profile (A2DP) for stereo audio, and/or an Audio/Video Remote Control profile (AVRCP) for remote control. Bluetooth® profiles may be selectively activated on the basis of connected Bluetooth®-enabled devices.

The input unit 160 receives a signal for manipulation of the Bluetooth® headset 100 from the user, and sends the received signal to the control unit 190. As such, the input unit 160 may include a multifunction button 162, a volume button 164, and a mode switch button 166.

The multifunction button 162 may be used in call handling and powering the Bluetooth® headset 100 on and off. The volume button 164 may be used to adjust the sound volume of the Bluetooth® headset 100.

The mode switch button 166 may be used to initiate a mode transition from the Bluetooth® connection mode to the pairing mode. That is, when the user presses the mode switch button 166, the control unit 190 (described below) detects a corresponding mode change request.

The control unit 190 controls the overall operation of the Bluetooth® headset 100. That is, the control unit 190 converts a signal received through the wireless communication unit 130 into an audible signal and outputs the audible signal through the audio processing unit 140, and performs control operations according to inputs from the input unit 160. In particular, the control unit 190 turns the Bluetooth® headset 100 on and off in response to a control signal from the multifunction button 162, adjusts the volume of sounds output from the audio processing unit 140 in response to a control signal from the volume button 164, and makes a mode transition from the Bluetooth® connection mode to the pairing mode in response to a control signal from the mode switch button 166.

Unlike conventional Bluetooth® headsets, when a request is received during the Bluetooth® connection mode (or the idle mode), the control unit 190 makes a direct transition to the pairing mode and performs a pairing procedure without turning the Bluetooth® headset 100 off and then back on. As such, the control unit 190 may include a mode switcher 192 and a pairing performer 194.

The mode switcher 192 makes a mode transition from the Bluetooth® connection mode to the pairing mode in response to a mode change request, and makes a mode transition from the pairing mode to the Bluetooth® connection mode after pairing is made with a Bluetooth®-enabled device. In this process, the mode switcher 192 makes a mode transition from the Bluetooth® connection mode to the pairing mode without turning off the Bluetooth® headset 100.

The pairing performer 194 performs a pairing procedure between the Bluetooth® headset 100 and another Bluetooth®-enabled device. For multipoint connection, in a state where the Bluetooth® headset 100 is paired with a Bluetooth®-enabled device, the pairing performer 194 performs a pairing procedure with another Bluetooth®-enabled device.

In the present exemplary embodiment, the pairing performer 194 performs a pairing procedure in an auto-pairing scheme. In the auto-pairing scheme, the user does not have to directly input a PIN code or passkey, because the pairing performer 194 automatically inputs a PIN code or passkey required for device registration. However, the user may also initiate a manual pairing procedure requiring direct input of a PIN code or passkey, if necessary.

The display unit 150 can include liquid crystal display (LCD) devices or light emitting diodes (LED) for visual display, and displays operating states of the Bluetooth® headset 100 in various formats under the control of the control unit 190.

The audio processing unit 140 outputs an audible-frequency signal corresponding to an audio signal that has originated from one of the Bluetooth®-enabled devices 200 and 300 (FIG. 1) and is processed by the control unit 190, and forwards a signal input from a microphone MIC to the control unit 190. As such, the audio processing unit 140 may include an amplifier (not shown) to amplify a signal from the control unit 190 to a preset amplitude, a speaker SPK to externally output a signal amplified by the amplifier, and a microphone MIC to receive an external input signal.

Next, a multi-point pairing method is described in detail.

Figure 3:
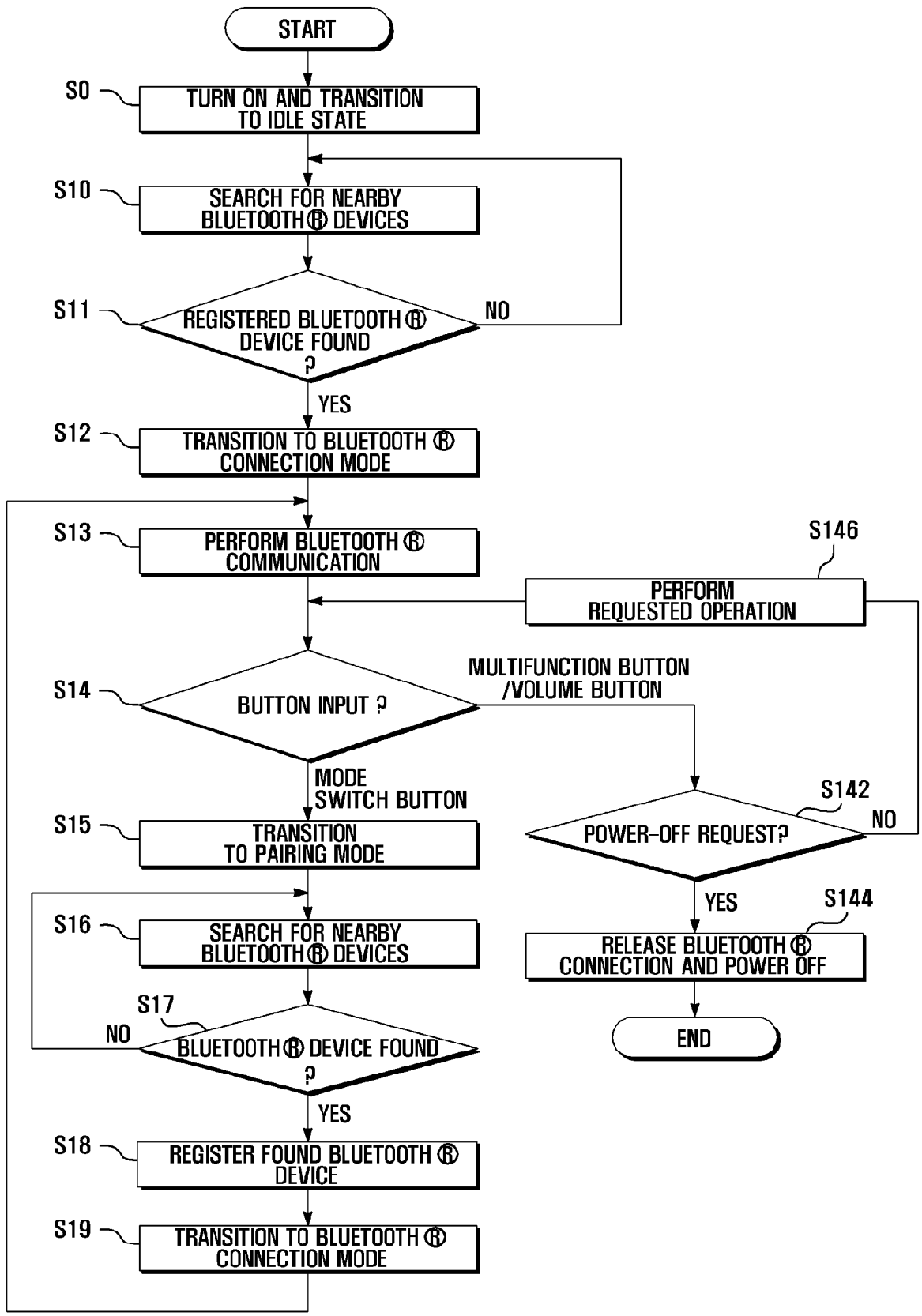
FIG. 3 is a flow chart showing a multi-point pairing method according to another exemplary embodiment of the present invention.

FIG. 3 is a flow chart showing a multi-point pairing method according to another exemplary embodiment of the present invention.

Referring to FIG. 1, FIG. 2, and FIG. 3, upon powering on, the Bluetooth® headset 100 makes a transition to an idle state as a normal operation (S0).

During the idle state, the control unit 190 of the Bluetooth® headset 100 performs an inquiry procedure to search for nearby Bluetooth®-enabled devices (S10). The Bluetooth® headset 100 determines if a registered Bluetooth®-enabled device is found (S11).

If a registered Bluetooth®-enabled device is found, the control unit 190 makes a transition to the Bluetooth® connection mode to connect to the registered Bluetooth®-enabled device (first Bluetooth® device) (S12). Here, a registered Bluetooth®-enabled device refers to a device registered through a pairing procedure in the past.

During the Bluetooth® connection mode, the control unit 190 attempts to establish a Bluetooth® connection to the first Bluetooth® device, and communicates with the first Bluetooth® device after establishment of the Bluetooth® connection (S13). In this step, the control unit 190 sends data to and receives data from the first Bluetooth® device through the Bluetooth® connection. If the first Bluetooth® device is an MP3 player 300, the MP3 player can send a signal carrying an audio stream to the Bluetooth® headset 100. The Bluetooth® headset 100 may send a control signal related to a 'next' command, 'previous' command, 'play' command, or 'resume' command to the MP3 player 300.

Similarly, in the case where the first Bluetooth® device is a mobile terminal 200, when an incoming call is received, the mobile terminal 200 may send a control signal to the Bluetooth® headset 100 notifying the Bluetooth® headset 100 of the call. The Bluetooth® headset 100 can send a control signal to make or answer a call to the mobile terminal 200. During a call, the Bluetooth® headset 100 sends and receives a voice signal to and from the mobile terminal 200.

In the following description, it is assumed that the first Bluetooth® device connected at step S12 is a sound output appliance such as an MP3 player 300. However, this assumption is not restrictive, and the first Bluetooth® device may be another sound output appliance such as a Bluetooth®-enabled personal computer or a Bluetooth®-enabled personal digital assistant.

The MP3 player 300 may be a sound output appliance that sends a stereo audio signal to the Bluetooth® headset 100. That is, an Advanced Audio Distribution Profile (A2DP) may be utilized to transmit stereo audio signal. The Bluetooth® headset 100 may be connected through an A2DP to the MP3 player 300 when a pairing procedure (not described) is carried out therebetween.

During Bluetooth® communication, the control unit 190 checks whether a key signal is input by the user through the input unit 160. That is, the control unit 190 checks whether a key signal associated with the mode switch button 166 the multifunction button 162, or volume button 164 is input (S14). If a key signal associated with the multifunction button 162 or volume button 164 is input, the control unit 190 checks whether the input key signal is a power-off request (S142). A power-off request may be issued by making a long key press on the multifunction button 162.

If the input key signal is a power-off request, the control unit 190 releases the current Bluetooth® connection to the MP3 player 300 and turns off the Bluetooth® headset 100 (S144).

If the input key signal is a control signal other than a power-off request, the control unit 190 performs a function corresponding to the control signal (S146). For example, when the control signal is a 'volume-up' command, the control unit 190 increases the volume of sounds output from the audio processing unit 140. When the control signal is a 'pause' command, the control unit 190 sends a 'pause' request signal to the MP3 player 300, which then causes audio reproduction to pause.

If a key signal associated with the mode switch button 166 is input at step S14, the mode switcher 192 of the control unit 190 makes a mode transition from the Bluetooth® connection mode to the pairing mode (S15). Unlike a conventional scheme, which requires turning the headset off and back on to transition to the pairing mode, the present method enables the Bluetooth® headset 100 to make a direct transition from the Bluetooth® connection mode or idle state to the pairing mode without turning the Bluetooth® headset 100 power off and back on. Hence, exemplary embodiments of the present invention may facilitate pairing.

During the pairing mode, the pairing performer 194 of the control unit 190 performs an inquiry procedure to search for an unregistered Bluetooth®-enabled device (S16). At this time, to allow the Bluetooth® headset 100 to pair with another Bluetooth®-enabled device (second Bluetooth® device), the user directs the second Bluetooth® device to enter the discoverable mode.

In the following description, it is assumed that the second Bluetooth® device to be paired is a mobile terminal 200. However, this assumption is not restrictive, and the second Bluetooth® device may be another Bluetooth®-enabled device capable of call processing.

The pairing performer 194 of the Bluetooth® headset 100 checks whether a registerable Bluetooth®-enabled device is found within range of the Bluetooth® headset 100 (S17). While the second Bluetooth® device is in the discoverable mode, the pairing performer 194 can detect a registerable Bluetooth®-enabled device (i.e. mobile terminal 200).

If the mobile terminal 200 is found, the pairing performer 194 registers the found mobile terminal 200 (S18). As described before, the auto-pairing scheme is used for device registration, in which the user does not have to directly input a PIN code or passkey. Hence, at step S18, the Bluetooth® headset 100 and the mobile terminal 200 may register each other through auto-pairing immediately after discovery.

Thereafter, the pairing performer 194 notifies the mode switcher 192 of the device registration, and the mode switcher 192 makes a mode transition from the pairing mode to the Bluetooth® connection mode (S19).

Accordingly, the Bluetooth® headset 100 is paired with two Bluetooth®-enabled devices (i.e. MP3 player and mobile terminal) at the same time.

After pairing with the mobile terminal 200, the Bluetooth® headset 100 returns to step S13 for Bluetooth® communication with the MP3 player 300 or mobile terminal 200. The Bluetooth® headset 100 is connected through a multipoint connection to the MP3 player 300 and mobile terminal 200. The multipoint technology is supported by Bluetooth® 2.0.

As described above, in the multi-point pairing method of exemplary embodiments of the present invention, the Bluetooth® headset 100 is not turned off when the Bluetooth® connection mode transitions to the pairing mode. That is, in response to input of a mode switch button, the Bluetooth® headset makes an immediate transition from the Bluetooth® connection mode or idle state to the pairing mode, and performs a pairing procedure. Hence, the process of pairing with a new Bluetooth®-enabled device may be fast and easy, thereby facilitating multipoint connection establishment.

In the description, the Bluetooth® headset is connected to a Bluetooth®-enabled MP3 player and a Bluetooth®-enabled mobile terminal. However, the Bluetooth® headset is also capable of connecting to various similar devices such as a personal digital assistant and a personal computer.

The Bluetooth® headset uses a mode switch button to make a transition from the Bluetooth® connection mode to the pairing mode. However, a combination of other buttons (for example, multifunction button and volume button) or a long key press of a particular button may also be used to issue a mode change request.

The Bluetooth® headset is connected to an MP3 player first, and then is paired with a mobile terminal. However, this sequence is not important. Hence, the Bluetooth® headset may also be connected or paired with the mobile terminal first, and then be paired with the MP3 player.

In addition, the Bluetooth® headset makes a transition from the Bluetooth® connection mode to the pairing mode. However, the Bluetooth® headset may also make a transition from the idle state to the pairing mode in response to a mode change request.

Finally, multipoint pairing is applied to a Bluetooth® headset. However, multipoint pairing may also be applied to other short-range wireless communication devices supporting multipoint technology.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A wireless headset, comprising:
    a key input unit to request a mode transition from a wireless connection mode to a pairing mode while maintaining a wireless connection to a first wireless device;
    a mode switcher to make a mode transition from the wireless connection mode to the pairing mode without turning off the wireless headset in response to a mode transition request, the pairing mode being provided to register a second wireless device with the wireless headset; and
    a pairing performer to perform a pairing procedure with the second wireless device during the pairing mode,
    wherein the mode transition request is issued using a combination of multiple buttons in the key input unit.

2. The wireless headset of claim 1, wherein the mode switcher is configured to make a mode transition from the pairing mode to the wireless connection mode after the pairing procedure is completed.

3. The wireless headset of claim 2, wherein the mode switcher is configured to make a mode transition between the wireless connection mode and the pairing mode without turning off the wireless headset.

4. The wireless headset of claim 1, wherein the mode transition request is issued using a mode switch button in the key input unit.

5. The wireless headset of claim 1, wherein the first wireless device is a sound output appliance and the second wireless device is a communication appliance.

6. The wireless headset of claim 5, wherein the first wireless device is connected through an Advanced Audio Distribution Profile (A2DP) and the second wireless device is connected through a HandsFree Profile (HFP).

7. A multi-point pairing method for a wireless headset, comprising:
    establishing a wireless connection to a first wireless device during a wireless connection mode;
    requesting a mode transition to a pairing mode during the wireless connection mode;
    making a mode transition from the wireless connection mode to the pairing mode without turning off the wireless headset in response to the mode transition request, the pairing mode being provided to register a second wireless device with the wireless headset;
    performing a pairing procedure with the second wireless device during the pairing mode; and
    establishing a wireless connection to the second wireless device while maintaining the wireless connection to the first wireless device after the pairing procedure is completed,
    wherein the mode transition request is issued using a combination of multiple buttons.

8. The multi-point pairing method of claim 7, further comprising making a mode transition from the pairing mode to the wireless connection mode after the pairing procedure is completed.

9. The multi-point pairing method of claim 7, wherein the mode transition request is issued using a mode switch button.

10. The multi-point pairing method of claim 7, wherein the first wireless device is a sound output appliance and the second wireless device is a communication appliance.

11. The multi-point pairing method of claim 10, wherein the first wireless device is connected through an Advanced Audio Distribution Profile (A2DP) and the second wireless device is connected through a HandsFree Profile (HFP).

12. The multi-point pairing method of claim 7, wherein the pairing procedure comprises:
    searching for a wireless device unregistered with the wireless headset; and
    registering the unregistered wireless device with the wireless headset upon finding the unregistered wireless device.

* * * * *